United States Patent
Fey et al.

(10) Patent No.: US 6,933,006 B2
(45) Date of Patent: *Aug. 23, 2005

(54) PROCESS FOR THE PRODUCTION OF PAINT COATING LAYERS

(75) Inventors: Thomas Fey, Mainz (DE); Oliver Reis, Witten (DE); Carmen Flosbach, Wuppertal (DE); Stuart Kernaghan, Bonn (DE); Karl-Friedrich Doessel, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 39 days.

This patent is subject to a terminal disclaimer.

(21) Appl. No.: 10/610,675

(22) Filed: Jul. 1, 2003

(65) Prior Publication Data

US 2004/0076766 A1 Apr. 22, 2004

Related U.S. Application Data

(60) Provisional application No. 60/418,775, filed on Oct. 16, 2002.

(51) Int. Cl.⁷ .................................................. B05D 3/06
(52) U.S. Cl. ........................ 427/146; 427/147; 427/148; 428/914
(58) Field of Search ................................ 427/146, 147, 427/148; 428/914

(56) References Cited

U.S. PATENT DOCUMENTS

| | | | | |
|---|---|---|---|---|
| 5,387,304 A | * | 2/1995 | Berner et al. ............... | 156/212 |
| 5,518,786 A | * | 5/1996 | Johnson et al. ............ | 428/40.6 |
| 5,912,081 A | | 6/1999 | Negele et al. | |
| 6,210,796 B1 | * | 4/2001 | Lobert et al. ........... | 428/355 R |
| 6,221,439 B1 | | 4/2001 | Negele et al. | |

FOREIGN PATENT DOCUMENTS

| | | |
|---|---|---|
| DE | 19654918 A1 | 1/1998 |
| EP | 0251546 A2 | 1/1988 |
| EP | 0361351 A3 | 4/1990 |
| EP | 0772514 B1 | 12/1998 |
| WO | WO 00/08094 A1 | 2/2000 |
| WO | WO 00/63015 A1 | 10/2000 |
| WO | WO 00/78847 A2 | 12/2000 |

* cited by examiner

*Primary Examiner*—Erma Cameron
(74) *Attorney, Agent, or Firm*—Steven C. Benjamin

(57) ABSTRACT

A process for the production of a coating layer from a coating composition curable with high-energy radiation on a substrate, comprising the successive steps:
  a) providing a substrate to be coated,
  b) applying a backing foil coated on one side with an uncured or at least only partially cured coating layer of a coating composition curable by means of high-energy radiation, with its coated side on the entire surface or at least one sub-zone of the surface of the substrate,
  c) irradiating the entire coating applied in step b) with high-energy radiation, and
  d) removing the backing foil from the coating which remains on the substrate;
wherein irradiation of the coating proceeds through the backing foil and/or after removal of the backing foil.

36 Claims, No Drawings

PROCESS FOR THE PRODUCTION OF PAINT COATING LAYERS

PRIORITY

This application claims priority from Provisional U.S. Patent Application Ser. No. 60/418,775, filed Oct. 16, 2002, incorporated herein by reference.

FIELD OF THE INVENTION

The invention relates to a process for the production of paint coating layers from a coating composition curable by means of high-energy radiation, in particular in the form of an outer coating layer of a multi-layer coating. The process may in particular find application in automotive and industrial coating.

BACKGROUND OF THE INVENTION

It is known to use coating compositions curable by high-energy radiation in automotive coating. Coating compositions based on free-radically polymerizable binders are in particular used in such applications. The following are advantages of radiation-curable coating compositions: very short curing times, low solvent emission of the coating compositions and good hardness and scratch resistance of the resulting coatings.

Prior art processes are known in which coated foils are applied onto the substrate, for example, an automotive body. The foils may here be provided on one side with one or more coating layers and may have on the same or the other side an adhesive layer so that the foil can be fixed to the substrate. Where appropriate binders are used, the coating and/or adhesive layers may also be cured by ultraviolet light (UV) radiation. Such foils and corresponding application processes are described, for example, in WO-A-00/08094, WO-A-00/63015, EP-A-251 546 and EP-A-361 351. In general, the foil is laminated onto the substrate, where it remains fixed to the substrate.

DE-A-196 54 918, U.S. Pat. No. 5,912,081 and U.S. Pat. No. 6,221,439 describe coating foils which are so-called free coating films. The coating foils comprise an adhesive layer and at least one coating layer. It is possible to dispense with a stabilizing backing foil in these cases.

WO 00/78847 describes free foils, which once applied onto appropriate substrate surfaces, are heated and/or irradiated with actinic radiation; the nature of the foils is described by means of physical parameters, while the material composition thereof remains largely unexplained. The physical behaviour of the foils may be adjusted by, for example, incorporating components into conventional and known foils, which components, on the one hand, act as plasticizers and, on the other, may be cured with actinic radiation or be removed from the foil, for example by vaporization.

It is desirable to find a way to be able to apply coatings of radiation-curable coating compositions without using conventional types of application, such as, for example, spray application. The use of adhesive layers or of backing layers, such as, for example, backing foils, which remain on the substrate should also be avoided.

SUMMARY OF THE INVENTION

The process according to the invention provides a process for the production of a paint coating layer, in particular, in the form of an outer coating layer of a multi-layer coating, wherein the coating layer is applied from a coating composition curable by means of high-energy radiation while avoiding spray application, no separate adhesive layer is used and the finished coating also does not comprise a backing layer, such as, for example, a foil, as a constituent. As a result, the substrate, in particular, a substrate provided with any desired precoating, is coated only with an additional coating layer applied from a coating composition curable by means of high-energy radiation and cured by means of high-energy radiation.

The invention relates to a process for the production of a paint coating layer from a coating composition curable by means of high-energy radiation, in particular, in the form of an outer coating layer of a multi-layer coating, comprising the following successive steps:

a) providing a substrate to be coated, in particular a substrate provided with a single layer or multi-layer precoating, b) applying a backing foil coated on one side with an uncured or at least only partially cured coating layer of a coating composition curable by means of high-energy radiation, with its coated side on the entire surface or at least one sub-zone of the surface of the substrate, c) irradiating the entire coating applied in step b) with high-energy radiation, in particular, UV (ultraviolet light) radiation, and d) removing the backing foil from the coating which remains on the substrate;

wherein irradiation of the coating proceeds through the backing foil and/or after removal of the backing foil.

DETAILED DESCRIPTION OF THE EMBODIMENTS

Steps c) and d) are preferably performed in such a manner that irradiation proceeds through the backing foil, the backing foil is removed after irradiation and irradiation is optionally performed again after removal of the backing foil. It is also possible, but less preferred, to irradiate the coating only after removal of the backing foil.

For brevity's sake, the term "coating layer" is used below and in the claims instead of the term "paint coating layer".

The individual steps of the process according to the invention are explained in greater detail below.

Step a) of the process according to the invention consists in the provision of a substrate to be coated. Substrates which may be considered for coating are any desired objects, of which the surface [sub-zone(s)] to be coated is/are accessible to the application of a coated backing foil according to step b) and to irradiation with high-energy radiation. These may, for example, comprise industrially or workshop produced objects made from any desired materials, such as, for example, metal, plastics, fibre-reinforced plastic or wood. Further possible objects are those that have been assembled from two or more different materials by composite construction to form a single structure to be coated. Preferred examples of substrates to be provided with a coating layer in the process according to the invention are any desired industrially produced goods, in particular, automotive bodies, body parts or body fittings.

The substrates may be uncoated or in particular be provided with a one-layer or multi-layer precoating. Examples of one-layer precoatings are primer coating layers, which are provided in the process according to the invention with an outer, opaque coating layer or coating layers that are provided in the process according to the invention with an outer, transparent coating layer. Examples of multi-layer precoatings are multi-layer coatings consisting of primer and surfacer, which are provided in the process according to the invention with an outer, opaque coating layer, but in particular multi-layer coatings consisting of primer and top coat which are provided in the process according to the invention with an outer coating layer. Examples of multi-layer coatings consisting of primer and top coat are, for example, coating structures known from the automotive coating sector comprising electrodeposited primer, optionally, surfacer or surfacer substitute layer and one-layer top coat or, instead of the one-layer top coat, a two-layer top coat comprising a color- and/or special effect-imparting base coat layer and a clear coat layer applied thereon. The outer coating layer applied by the process according to the invention may have the most varied purposes, some of which are stated below by way of example, in particular the outer coating layer may, depending upon the chemical composition thereof, be applied as a transparent sealing layer providing protection against the most varied external influences.

In step b) of the process according to the invention, a backing foil coated on one side with an uncured or at least only partially cured coating layer of a coating composition curable by means of high-energy radiation is applied with its coated side on the entire surface or on at least one sub-zone of the surface of the substrate.

The backing foil comprises colored or colorless, in particular transparent foils made from any desired plastics, in particular thermoplastics, that meet certain requirements with regard to UV transmittance and heat resistance. In the case of the preferred embodiment of irradiation in which high-energy radiation is passed through the backing foil, the foils must transmit UV radiation and be resistant to the temperatures that arise in the foil material on irradiation with UV radiation. The foils must also be resistant to the temperatures optionally required for partially gelling/tackifying the applied coating layer. Suitable foil materials are, for example, polyolefins, such as, polyethylene, polypropylene; polyurethane; polyamide and polyesters, such as, polyethylene terephthalate and polybutylene terephthalate. The foils may also consist of polymer blends and also may be optionally surface-treated. It is also possible for the foils to have a textured surface, for example, a micro- and/or macro-textured surface. A textured foil surface, for example, is convenient if the surface of the coating layer to be applied in the process according to the invention is to exhibit corresponding textures. In this case, the side of the foil to be coated would comprise a negative of the appropriate textures and, after removal of the textured backing foil, the textures may then be formed as a positive in the outer surface of the outer coating layer produced using the process according to the invention. The thickness of the foils may, for example, be between 10 and 1000 $\mu$m, preferably, between 10 and 500 $\mu$m, particularly preferably, between 20 and 250 $\mu$m and is determined by practical considerations of processability. The foils selected should preferably be those that are elastic and extensible and cling effectively to the substrate by electrostatic forces.

The backing foils are coated on one side with liquid or pasty coating compositions curable by means of high-energy radiation. The coating compositions may be aqueous, diluted with solvents or contain neither solvents nor water. The coating compositions curable by irradiation with high-energy radiation are cationically and/or free-radically curable coating compositions known to the person skilled in the art, wherein free-radically curable coating compositions are preferred.

Cationically curable coating compositions that are to be applied onto the backing foil contain one or more cationically polymerizable binders. These may comprise conventional binders known to the person skilled in the art, such as, polyfunctional epoxy oligomers containing more than two epoxy groups per molecule. These comprise, for example, polyalkylene glycol diglycidyl ethers, hydrogenated bisphenol A glycidyl ethers, epoxyurethane resins, glycerol triglycidyl ether, diglycidyl hexahydrophthalate, diglycidyl esters of dimer acids, epoxidized derivatives of (methyl) cyclohexene, such as, for example, 3,4-epoxycyclohexylmethyl (3,4-epoxycyclohexane) carboxylate or epoxidized polybutadiene. The number average molar mass of the polyepoxy compounds is preferably below 10,000. Reactive diluents, such as, cyclohexene oxide, butene oxide, butanediol diglycidyl ether or hexanediol diglycidyl ether, may also be used.

The cationically curable coating compositions contain one or more photoinitiators. Photoinitiators that may be used are onium salts, such as, diazonium salts and sulfonium salts.

Free-radically curable coating compositions that are preferably to be applied onto the backing foil contain one or more binders with free-radically polymerizable olefinic double bonds. Suitable binders having free-radically polymerizable olefinic double bonds that may be considered are, for example, all the binders known to the skilled person that can be cross-linked by free-radical polymerization. These binders are prepolymers, such as, polymers and oligomers containing, per molecule, one or more, preferably on average 2 to 20, particularly preferably 3 to 10 free-radically polymerizable olefinic double bonds. The polymerizable double bonds may, for example, be present in the form of (meth)acryloyl, vinyl, allyl, maleate and/or fumarate groups. The free-radically polymerizable double bonds are particularly preferably present in the form of (meth)acryloyl groups.

Both here and below, (meth)acryloyl or (meth)acrylic are respectively intended to mean acryloyl and/or methacryloyl or acrylic and/or methacrylic.

Examples of prepolymers or oligomers include (meth) acryloyl-functional poly(meth)acrylates, polyurethane (meth)acrylates, polyester (meth)acrylates, unsaturated polyesters, polyether (meth)acrylates, silicone (meth) acrylates, epoxy (meth)acrylates, amino (meth)acrylates and melamine (meth)acrylates. The number average molar mass Mn of these compounds may be, for example, 500 to 10,000 g/mole, preferably 500 to 5,000 g/mole. The binders may be used individually or as a mixture. (Meth)acryloyl-functional poly(meth)acrylates and/or polyurethane (meth)acrylates are preferably used.

The prepolymers may be used in combination with reactive diluents, i.e., free-radically polymerizable low molecular weight compounds with a molar mass of below 500 g/mole. The reactive diluents may be mono-, di- or polyunsaturated. Examples of monounsaturated reactive diluents include: (meth)acrylic acid and esters thereof, maleic acid and semi-esters thereof, vinyl acetate, vinyl ethers, substituted vinylureas, styrene, vinyltoluene. Examples of diunsaturated reactive diluents include: di(meth)acrylates, such as, polyethylene glycol di(meth)acrylate, 1,3-butanediol di(meth)acrylate, vinyl (meth)acrylate, allyl (meth)acrylate, divinylbenzene, dipropylene glycol di(meth)acrylate, hexanediol di(meth)acrylate. Examples of polyunsaturated reactive diluents are: glycerol tri(meth)acrylate, trimethylolpropane tri(meth)acrylate, pentaerythritol tri(meth)acrylate, pentaerythritol tetra(meth)acrylate. The reactive diluents may be used alone or in mixture.

The preferred free-radically curable coating compositions contain one or more photoinitiators, for example, in quantities of 0.1 to 5 wt-%, preferably of 0.5 to 3 wt-%, relative to the sum of free-radically polymerizable prepolymers, reactive diluents and photoinitiators. Examples of photoinitiators are benzoin and derivatives thereof, acetophenone and derivatives thereof, for example 2,2-diacetoxyacetophenone, benzophenone and derivatives thereof, thioxanthone and derivatives thereof, anthraquinone, 1-benzoylcyclohexanol, organophosphorus compounds, such as, acylphosphine oxides. The photoinitiators may be used individually or in combination.

It is possible, although less preferred, for the coating compositions curable by means of high-energy radiation to contain, in addition to the binder components free-radically and/or cationically polymerizable by means of high-energy radiation, or in addition to the free-radically and/or cationically polymerizable functional groups, further binder components or further functional groups that are chemically cross-linkable by an additional curing mechanism. Further chemically cross-linking binders that may preferably be used are one-component binder systems, for example, based on OH-functional compounds, aminoplast resins and/or blocked polyisocyanates and those based on carboxy-functional and epoxy-functional compounds. Moisture-curing binder components are also possible, for example, compounds with free isocyanate groups, with hydrolyzable alkoxysilane groups or with ketimine- or aldimine-blocked amino groups. In the event that the coating compositions contain binders or functional groups that cure by means of atmospheric humidity, certain conditions must be maintained during preparation of the coated backing foils in order to avoid premature curing. This issue is addressed in greater detail below in the description of the form of the coated backing foil. The additional functional groups and the free-radically and/or cationically polymerizable functional groups may be present in the same binder and/or in separate binders.

The coating compositions that may be used for coating the backing foil may be pigmented or un-pigmented coating compositions. Un-pigmented coating compositions are, for example, coating compositions formulated in conventional manner as clear coats. Pigmented coating compositions contain color-imparting and/or special effect-imparting pigments. Suitable color-imparting pigments are any conventional coating pigments of an organic or inorganic nature. Examples of inorganic or organic color-imparting pigments are titanium dioxide, micronized titanium dioxide, iron oxide pigments, carbon black, azo pigments, phthalocyanine pigments, quinacridone or pyrrolopyrrole pigments. Examples of special effect-imparting pigments are metal pigments, for example, made from aluminium or copper; interference pigments, such as, metal oxide coated metal pigments, titanium dioxide coated mica.

The coating compositions may also contain transparent pigments, soluble dyes and/or extenders. Examples of usable extenders are silicon dioxide, aluminium silicate, barium sulfate, calcium carbonate and talc.

The coating compositions may also contain conventional coating additives. Examples of conventional coating additives include levelling agents, rheological agents, such as, highly disperse silica or polymeric urea compounds, thickeners, for example, based on partially cross-linked, carboxy-functional polymers or on polyurethanes, defoamers, wetting agents, anticratering agents, catalysts, antioxidants and light stabilizers based on HALS (hindered amine light stabilizer) products and/or UV absorbers. The additives are used in conventional amounts known to the person skilled in the art.

The coating compositions may contain water and/or organic solvents conventional in coatings and known to the person skilled in the art.

The coating compositions curable by means of high-energy radiation may be applied onto the backing foil by conventional methods, for example, by brushing, roller coating, pouring, blade coating or spraying. The coating composition may be applied as a melt or in the liquid phase, for example, as a solution. The coating compositions may, for example, be blade coated as a solution. In the subsequent drying process, the solvent is allowed to evaporate, optionally, with gentle heating. The coating must in no event be completely cross-linked during the drying process. The dried, uncross-linked coating should advantageously be at least slightly tacky at room temperature in order to ensure good adhesion onto the substrate. The coating may either be intrinsically tacky, for example, due to specially formulated binders or tackiness may be achieved by slight partial cross-linking/gelling of the dried coating, for example, by heating and/or by UV irradiation. The coating compositions curable by means of high-energy radiation are generally applied in a layer thickness of 1 to 100 $\mu$m, preferably of 5 to 60 $\mu$m.

It may be advantageous to apply the coating with a layer thickness that reduces towards the edges of the backing foil so that, when it is subsequently applied, edge marks on the substrate surface are avoided.

In order to facilitate subsequent removal of the backing foil, it may be advantageous to leave at least one edge zone of the backing foil uncoated. It may also be advantageous to provide a special finish on the side of the backing foil that is to be coated, for example, a release coating, or to use special surface-treated foils, for example, foils surface-modified with silicate layers, in order, on removal of the backing foil, to facilitate detachment from the coating that is fixed to the substrate.

It may also be advantageous to provide the coated backing foil with a temporary protective foil to provide protection. The protective foil may here be present only on the coated side of the backing foil, but it may also be applied onto both sides and completely enclose the entire coated backing foil. The latter possibility would in particular be advisable in the event of presence of the above-described moisture-curing binder or functional groups in order to exclude atmospheric humidity. In order to protect the coating on the backing foil from premature polymerization brought about by UV radiation, a transparent or colored, protective foil material, that does not transmit UV radiation, for example, a black protective foil material may be used advantageously. In order to facilitate detachment of the protective foil, it too may also be provided with non-stick properties, as described above.

The coated backing foils, optionally provided with protective foil or protective envelope, may be prefabricated and stored in the most varied shapes and sizes, for example, in sizes of 0.5 cm$^2$ to 2 m$^2$. The coated backing foils may also be stored as a reel of continuous foil.

The coated backing foils may be cut into pieces of the correct size adapted to the coating task before use for the production of the coating on the substrate or they are already correctly dimensioned, for example, in the form of a set of coated backing foils cut to fit the surface [sub-zone(s)] of the substrate in question.

After removal of an optionally present protective foil or protective sleeve, the coated backing foil is placed with its coated side on the entire surface or at least one sub-zone of the surface of the substrate.

Whether it is the entire surface or only at least one sub-zone of the surface of the substrate that are to be coated with the coating layer is determined by the nature of the substrate and/or by the task to be performed by the coating layer produced using the process according to the invention. If the entire surface of a substrate is accessible to the application of a coated backing foil according to step b) and to high-energy radiation, there are no restrictions determined by the substrate and the entire substrate surface can be provided with the coating layer using the process according to the invention. In the case of three-dimensional substrates of a complicated shape, especially those having cavities and undercuts, such as, for example, automotive bodies, it is not possible to provide the entire surface with a coating layer using the process according to the invention and use of the process according to the invention is limited to those surface zones that are accessible to the application of a coated backing foil according to step b) and to high-energy radiation.

Depending upon the task to be performed by the coating layer produced using the process according to the invention, it may be desired to coat the entire surface or only at least one sub-zone of the surface of a substrate. The phrase "at least one sub-zone of the surface of a substrate" does not mean only "one or more surface zones of a substrate accessible to the application of a coated backing foil according to step b) and to high-energy radiation", but in particular also includes just one or more sub-areas of those surface zones that are accessible to the application of a coated backing foil according to step b) and to high-energy radiation.

Examples of one or more tasks that the outer coating layer produced using the process according to the invention may simultaneously perform are the provision of a) optical properties, such as, imparting a certain degree of gloss, for example, provision of matt, silk or high-gloss surfaces (which may for example be achieved by using a coated backing foil which has or lacks a corresponding texture of its surface located beneath the coating), providing a decorative effect, for example, providing a colored surface and/or a surface exhibiting effects dependent upon the angle of observation (may be achieved by appropriate pigmentation of the coating located on the backing foil), providing a surface exhibiting interference phenomena (may be achieved by using a coated backing foil which exhibits a corresponding texture of its surface located beneath the coating), and/or b) technical properties, such as, acid resistance, chemical resistance, scratch resistance, low soiling tendency, for example, anti-graffiti properties, self-cleaning effect, for example, in rain.

While, as the person skilled in the art is aware, resistance to acids, chemicals and scratching and a low soiling tendency are substantially determined by the chemical composition of the coating composition curable by means of high-energy radiation which has been applied onto the backing foil, the self-cleaning effect may also be achieved by an appropriate texture of the side of the backing foil beneath the coating, wherein the texture is a negative of a self-cleaning surface texture. Self-cleaning surface textures are known to the person skilled in the art from the Lotus Effect®, which has recently been the subject of considerable discussion, or for example from EP-B-0 772 514.

When only sub-zones of the surface of a substrate are coated using the process according to the invention, it is up to the user to decide which sub-zones of the surface are to be provided with a coating layer using the process according to the invention and which are not. This may be illustrated by way of example by the application of a transparent sealing coat layer, in this case for scratch protection purposes, onto an automotive body provided with a precoating in the form of a per se complete multi-layer coating comprising an electrodeposited primer, surfacer coat, base coat and clear coat. The transparent sealing coat layer may then actually be applied using the process according to the invention onto areas of the body that are exposed to a particular risk of scratching in service. Examples of areas of a motor vehicle which are at particular risk of scratching in service are the areas around the locks or door handles together with loading areas or door openings, in particular for example where sills jut out beneath door openings, which are at particular risk of scratching when occupants get into or out of the vehicle. Further examples of areas of an automotive body that are at risk of scratching are areas which are suitable for accommodating external loads, for example, the roof or hatchback.

The coated backing foils are applied by lamination, preferably under pressure and optionally with heating and the coating is thus attached to the substrate. This may in particular be achieved by using devices known from laminate production which have optionally been suitably modified, for example, with a heatable roll, for example, a rubber roll.

Once the coated backing foil has been applied with its coated side onto the surface [sub-zones(s)] of the substrate to be provided with the coating layer, the entire coating layer so applied is irradiated with high-energy radiation in step c) in order to effect cure (by means of free-radical and/or cationic polymerization). UV radiation or electron beam radiation may be used as high-energy radiation. UV radiation is preferred. Irradiation may be performed through the backing foil and/or the coating is directly irradiated after removal of the backing foil. Irradiation may proceed continuously or discontinuously (in cycles).

Depending upon the coating task in each single case irradiation may be carried out, for example, in a belt unit fitted with one or more UV radiation emitters or with one or more UV radiation emitters positioned in front of the object to be irradiated, or the area to be irradiated, or the substrate to be irradiated and/or the UV radiation emitter(s) is(are) moved relative to one another during irradiation. For example, the substrate to be irradiated may be moved through an irradiation tunnel fitted with one or more UV radiation emitters, and/or a robot equipped with one or more UV radiation emitters may guide the UV radiation emitter(s) over the substrate surface. Particularly in workshops it is also possible to use UV hand lamps.

In principle, the duration of irradiation, distance from the object and/or radiation output of the UV radiation emitter may be varied during UV irradiation. The preferred source of radiation comprises UV radiation sources emitting in the wavelength range from 180 to 420 nm, in particular, from 200 to 400 nm. Examples of such continuously operating UV radiation sources are optionally doped high, medium and low pressure mercury vapour emitters and gas discharge tubes, such as, for example, low pressure xenon lamps.

However, it is also possible to use discontinuous UV radiation sources. These are preferably so-called high-energy flash devices (UV flash lamps for short). The UV flash lamps may contain a plurality of flash tubes, for example, quartz tubes filled with inert gas, such as, xenon. The UV flash lamps have an illuminance of, for example, at least 10 megalux, preferably, from 10 to 80 megalux per flash discharge. The energy per flash discharge may be, for example, 1 to 10 kJoule.

The irradiation time with UV radiation when UV flash lamps are used as the UV radiation source may be, for example, in the range from 1 millisecond to 400 seconds, preferably, from 4 to 160 seconds, depending on the number of flash discharges selected. The flashes may be triggered, for example, about every 4 seconds. Curing may occur, for example, by means of 1 to 40 successive flash discharges.

If continuous UV radiation sources are used, the irradiation time may be, for example, in the range from a few seconds to about 5 minutes, preferably less than 5 minutes.

The distance between the UV radiation sources and the substrate surface to be irradiated may be, for example, 5 to 60 cm.

Irradiation with UV radiation may proceed in one or more successive irradiation steps. In other words, the energy to be applied by irradiation may be supplied completely in a single irradiation step or in portions in two or more irradiation steps.

When the coatings are irradiated by means of UV radiation, in particular with UV flash lamps, temperatures may be generated on the coating that are such that, in the event that the coatings cure by an additional cross-linking mechanism as well as UV-induced polymerization, they give rise to at least partial curing by means of this additional cross-linking mechanism.

In order to cure the coatings by means of the additional cross-linking mechanism, the coatings may, however, also be exposed to relatively high temperatures of, for example, 60 to 140° C. to cure completely. Complete curing may take place by conventional methods, for example, in an oven or in a conveyor unit, for example, with hot air or infrared radiation. Depending upon the curing temperature, curing times of 1 to 60 minutes are possible. The additional thermal curing can be performed prior to, during and/or after UV irradiation. If additional thermal curing takes place before removal of the backing foil, an appropriately heat-resistant foil material must be selected depending upon the curing temperatures required for the additional thermal curing. The temperature sensitivity of the substrate must also be taken into consideration when selecting the curing temperature.

For coatings that are curable by UV-induced free-radical and/or cationic polymerization but not enhanced by an additional cross-linking mechanism, it may be expedient to supply additional thermal energy, for example, with an infra-red lamp, to support the curing.

In the preferred case of irradiation with UV radiation through the backing foil, the foil is removed after irradiation. In the case of additional thermal curing, it is expedient, if the coating is first allowed to cool before the foil is removed.

In one embodiment of the process according to the invention, a partial curing of the coating is effected by UV irradiation (by means of free-radical and/or cationic polymerization) through the backing foil and performing final curing in a second irradiation step after removal of the foil. In other words, the radiation dose required for complete cure (by means of free-radical and/or cationic polymerization) is supplied in at least two separate UV irradiation steps. In the event that the coating contains binders that cure by an additional cross-linking mechanism, it also is possible in a first step completely or partially to cure the coating with regard to the free-radical and/or cationic polymerization by means of UV radiation and, after removal of the foil, firstly to perform any outstanding final curing with regard to free-radical and/or cationic polymerisation by means of UV radiation and then to supply thermal energy for further curing by means of the additional cross-linking mechanism.

While the process according to the invention relates to the production of external coating layers, it is, of course, also possible in principle, subject to appropriate adaptation of the process, to use the coated backing foils for the production of primer or intermediate layers in multi-layer coatings.

The process according to the invention is in particular suitable for the production of outer coating layers in industrial and automotive coating and, in the case of automotive coating, is not restricted to industrial automotive coating, but also includes use in automotive repair facilities, for example, for the purpose of subsequently providing the entire surface or one or more sub-zones of the surface of an automotive substrate with an outer coating layer.

As mentioned above, the process according to the invention may be used in many different sectors for the production of outer coating layers on the entire surface or at least one sub-zone of the surface of the most varied substrates. As likewise already explained above, the coating layers may perform many different tasks, and thus, in many cases, advantageously contribute the known favorable technical properties of coating layers which have been produced from radiation-curable coating compositions. Conventional application methods, such as, in particular, spraying, and the associated disadvantages are avoided. For example, there is no over-spray and, in particular when only sub-zones of the surface are being coated, masking or masking templates are not required for the surface zones which are not to be coated, as the coating layer produced in the process according to the invention is already present in the desired size on the backing foil and is transferred from said backing foil onto the substrate to be coated or the sub-zones thereof which are to be coated.

The following example is intended to illustrate the invention in greater detail.

EXAMPLE pbw=parts by weight
wt-%=weight-%
Production of a Coated Backing Foil:

A polyurethane resin curable by means of UV radiation was first produced as follows:

369.4 pbw of isophorone diisocyanate were combined with 0.6 pbw of methylhydroquinone and 80 pbw of butyl acetate and heated to 80° C. A mixture of 193 pbw of hydroxyethyl acrylate and 0.5 pbw of dibutyltin dilaurate was added dropwise in such a manner that the reaction temperature did not rise above 100° C. 50 pbw of butyl acetate were used to rinse out the dropping funnel. The temperature was maintained at a maximum of 100° C. until an NCO-value of 10.1 was obtained. 300 pbw of a polycaprolactone triol (Capa 305 from Interox Chemicals) and 50 pbw of butyl acetate were then added. The reaction mixture was maintained at a maximum of 100° C. until an NCO-value of <0.5 was obtained. The mixture was then diluted with 69.6 pbw of butyl acetate. A colorless, highly viscous resin with a solids content of 75 wt-% (1 h/150° C.) and a viscosity of 10,000 mPas was obtained.

A clear coat curable by means of UV radiation was then produced from the following constituents:

80.8 wt-% of the acryloyl-functional polyurethane resin produced above
1.3 wt-% of a conventional commercial photoinitiator (Irgacure® 184/CIBA)
0.1 wt-% of a conventional commercial levelling agent (Ebecryl® 350/UCB)
0.8 wt-% of a conventional commercial UV absorber (Tinuvin® 384/CIBA)
0.8 wt-% of a conventional commercial light stabiliser (HALS based) (Tinuvin® 292/CIBA)
16.2 wt-% of butyl acetate.

The resultant clear coat was then applied onto a backing foil. To this end, the clear coat was blade coated to a dry layer thickness of 40 µm onto one side of a 20 µm thick polyester foil. The applied clear coat layer was dried for 10 minutes at 60° C. to evaporate the solvent. A slightly tacky, no longer flowable surface was obtained.

Application of the Coated Backing Foil

An appropriate piece (20 cm×15 cm) of the above-coated foil was placed with its coated side onto one half of a 20 cm×30 cm metal test panel which had been coated with a typical automotive multi-layer coating comprising electrodeposited primer, surfacer coat, base coat and clear coat.

The coating layer was then heated through the foil with an IR radiation emitter to approximately 80° C. and laminated without bubbles under gentle pressure. The still warm and softened coating material was then irradiated through the backing foil by means of 5 flashes from a UV flash lamp (3000 Ws) at a distance of 20 cm. The UV-flashes were triggered every 4 seconds. The foil was then peeled off and the coating layer post-cured with 10 UV-flashes. The half of the surface sealed with the coating layer which had been transferred from the backing foil onto the multi-layer coating and cured was distinguished by elevated scratch and acid resistance in comparison with the unsealed half.

What is claimed is:

1. A process for the production of a coating layer from a coating composition curable with radiation selected from UV radiation and electron beam radiation on a substrate, comprising the successive steps:
    a) providing a substrate to be coated,
    b) applying a backing foil coated on one side with an uncured or at least only partially cured coating layer of a coating composition curable by means of radiation, with its coated side on the entire surface or at least one sub-zone of the surface of the substrate,
    c) irradiating the entire coating applied in step b) with radiation, and
    d) removing the backing foil from the coating which remains on the substrate.

2. The process of claim 1, wherein the substrate to be coated is provided with a precoating comprising at least one layer.

3. The process of claim 1, wherein the surface of the backing foil in adherence with the coating is textured.

4. The process of claim 1, wherein the uncured or at least only partially cured coating layer in step b) is a coating layer with a tacky surface.

5. The process of claim 1, wherein the coating composition curable by means of radiation applied in step b) contains at least one binder with free-radically polymerizable olefinic double bonds.

6. The process of claim 1, wherein the coated backing foil is applied in step b) with pressure.

7. The process of claim 1, wherein the coated backing foil is applied in step b) with pressure and heat.

8. The process of claim 1, wherein UV radiation of the wavelength range 180–420 nm is used as the radiation.

9. The process of claim 1, wherein the substrate provided in step a) is selected from the group consisting of automotive bodies, body parts and body fittings.

10. The process of claim 1, wherein the coating composition is applied in step b) as a transparent sealing coating composition.

11. The process of claim 10, wherein the transparent sealing coating composition is applied only onto at least a sub-zone of the surface of the substrate which is accessible to the application of a coated backing foil according to step b) and to irradiation with radiation.

12. A substrate provided with a coating layer using the process of claim 1.

13. A process for the production of a coating layer from a coating composition curable with radiation selected from UV radiation and electron beam radiation on a substrate, comprising the successive steps:
    a) providing a substrate to be coated,
    b) applying a backing foil coated on one side with an uncured or at least only partially cured coating layer of a coating composition curable by means of radiation, with its coated side on the entire surface or at least one sub-zone of the surface of the substrate,
    c) irradiating the entire coating applied in step b) with radiation,
    d) removing the backing foil from the coating which remains on the substrate and
    e) additionally irradiating the entire coating applied in step b) with radiation.

14. The process of claim 13, wherein the substrate to be coated is provided with a precoating comprising at least one layer.

15. The process of claim 13, wherein the surface of the backing foil in adherence with the coating is textured.

16. The process of claim 13, wherein the uncured or at least only partially cured coating layer in step b) is a coating layer with a tacky surface.

17. The process of claim 13, wherein the coating composition curable by means of radiation applied in step b) contains at least one binder with free-radically polymerizable olefinic double bonds.

18. The process of claim 13, wherein the coated backing foil is applied in step b) with pressure.

19. The process of claim 13, wherein the coated backing foil is applied in step b) with pressure and heat.

20. The process of claim 13, wherein UV radiation of the wavelength range 180–420 nm is used.

21. The process of claim 13, wherein the substrate provided in step a) is selected from the group consisting of automotive bodies, body parts and body fittings.

22. The process of claim 13, wherein the coating composition is applied in step b) as a transparent sealing coating composition.

23. The process of claim 22, wherein the transparent sealing coating composition is applied only onto at least a sub-zone of the surface of the substrate which is accessible to the application of a coated backing foil according to step b) and to irradiation with radiation.

24. A substrate provided with a coating layer using the process of claim 13.

25. A process for the production of a coating layer from a coating composition curable with radiation selected from UV radiation and electron beam radiation on a substrate, comprising the successive steps:
    a) providing a substrate to be coated,
    b) applying a backing foil coated on one side with an uncured or at least only partially cured coating layer of a coating composition curable by means of radiation, with its coated side on the entire surface or at least one sub-zone of the surface of the substrate, c) removing the backing foil from the coating which remains on the substrate and d) irradiating the entire coating applied in step b) with radiation.

26. The process of claim 25, wherein the substrate to be coated is provided with a precoating comprising at least one layer.

27. The process of claim 25, wherein the surface of the backing foil in adherence with the coating is textured.

28. The process of claim 25, wherein the uncured or at least only partially cured coating layer in step b) is a coating layer with a tacky surface.

29. The process of claim 25, wherein the coating composition curable by means of radiation applied in step b) contains at least one binder with free-radically polymerizable olefinic double bonds.

30. The process of claim 25, wherein the coated backing foil is applied in step b) with pressure.

31. The process of claim 25, wherein the coated backing foil is applied in step b) with pressure and heat.

32. The process of claim 25, wherein UV radiation of the wavelength range 180–420 nm is used.

33. The process of claim 25, wherein the substrate provided in step a) is selected from the group consisting of automotive bodies, body parts and body fittings.

34. The process of claim 25, wherein the coating composition is applied in step b) as a transparent sealing coating composition.

35. The process of claim 34, wherein the transparent sealing coating composition is applied only onto at least a sub-zone of the surface of the substrate which is accessible to the application of a coated backing foil according to step b) and to irradiation with radiation.

36. A substrate provided with a coating layer using the process of claim 25.

* * * * *